(12) United States Patent
Cahall et al.

(10) Patent No.: US 11,448,847 B2
(45) Date of Patent: Sep. 20, 2022

(54) MULTI-CAMERA FILTER MOUNT

(71) Applicant: Moondog Optics, Inc., Fairport, NY (US)

(72) Inventors: Scott C. Cahall, Fairport, NY (US); Mark Bridges, Spencerport, NY (US); Peter Lilley, Penfield, NY (US)

(73) Assignee: Moondog Optics, Inc., Fairport, NY (US)

( * ) Notice: Subject to any disclaimer, the term of this patent is extended or adjusted under 35 U.S.C. 154(b) by 0 days.

(21) Appl. No.: 17/346,614

(22) Filed: Jun. 14, 2021

(65) Prior Publication Data

US 2021/0389544 A1 Dec. 16, 2021

Related U.S. Application Data

(60) Provisional application No. 63/039,697, filed on Jun. 16, 2020.

(51) Int. Cl.
*G03B 17/56* (2021.01)
*G02B 7/00* (2021.01)
*G03B 17/14* (2021.01)

(52) U.S. Cl.
CPC ............. *G02B 7/006* (2013.01); *G03B 17/14* (2013.01); *G03B 17/566* (2013.01)

(58) Field of Classification Search
CPC .................................................... G03B 17/566
See application file for complete search history.

(56) References Cited

U.S. PATENT DOCUMENTS

| 10,188,294 B2 * | 1/2019 | Myung ................... A61B 3/10 |
| 10,795,240 B2 * | 10/2020 | Barros ................. H04N 5/2252 |
| 11,073,743 B2 * | 7/2021 | Deavis ................. H04N 5/2254 |
| 2013/0177304 A1 * | 7/2013 | Chapman ............. G03B 17/565 396/533 |

FOREIGN PATENT DOCUMENTS

| CN | 106899720 A | * | 6/2017 | .......... H04M 1/0264 |
| JP | 2009205091 A | * | 9/2009 | |

OTHER PUBLICATIONS

Sirui IPhone X Case w/ Dual built in lens, Amazon.com product listing at https://www.amazon.com/Sirui-iPhone-Built-Angle-Portrait/dp/B07H3QH14C (Year: 2018).*
Ulanzi U filter adapter product page, https://www.ulanzi.com/products/ulanzi-u-filter-adapter-62mm-67mm-filter-bracket (Year: 2020).*
Apexel 52mm Filter Lens Kit, Amazon.com product listing at https://www.amazon.com/Apexel-Graduated-Lens-Red-Smartphone-Olympus/dp/B07ZM9NBX2/ (Year: 2019).*

* cited by examiner

*Primary Examiner* — Leon W Rhodes, Jr.
(74) *Attorney, Agent, or Firm* — Louis S. Horvath

(57) ABSTRACT

A filter mount for removably coupling an optical element to an encasement for a personal electronics device that provides openings for light paths to at least first and second cameras within the encasement. The filter mount has a frame that defines a first orifice having a bayonet coupling, wherein the first orifice provides a first light path for imaging to at least the first camera, and a second orifice, adjacent to and coplanar with the first orifice and configured to provide a second light path for imaging to at least the second camera. Rotation of the filter mount frame within the bayonet coupling couples the filter mount against the encasement and opens at least the first and second light paths to the corresponding cameras.

18 Claims, 15 Drawing Sheets

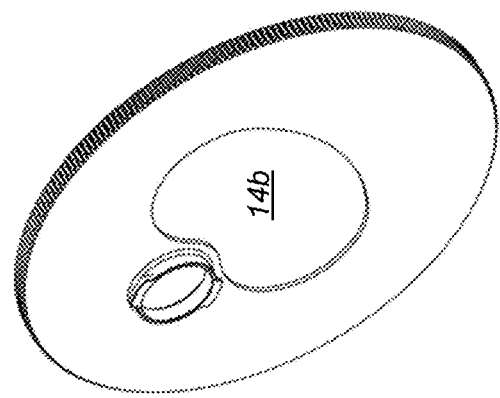
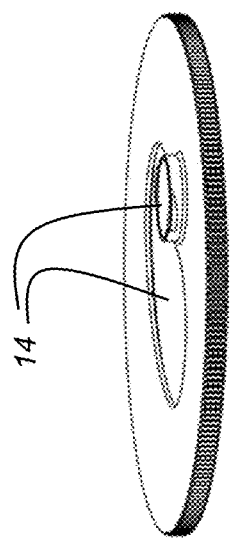
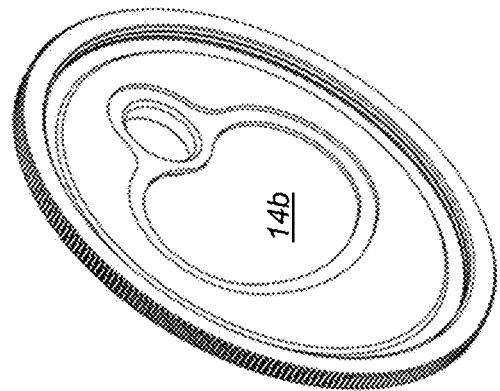
FIG. 1C

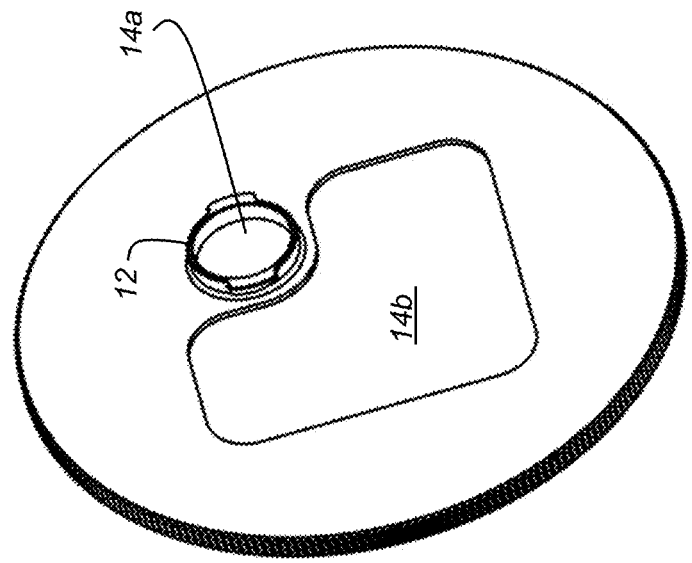
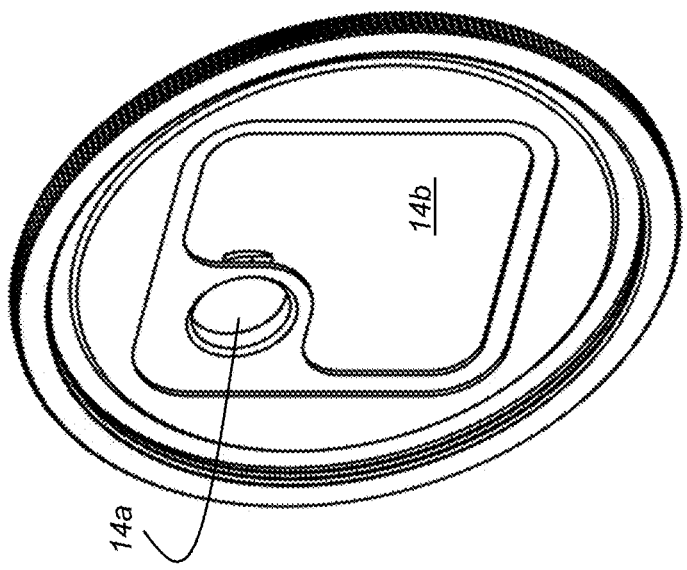
FIG. 1D

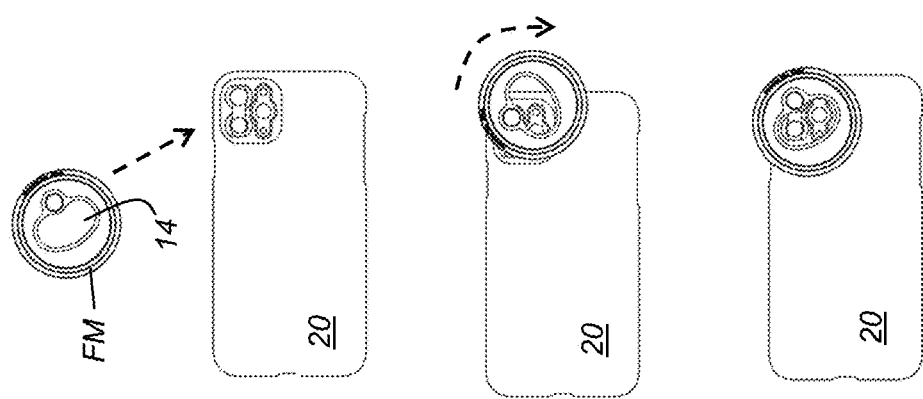

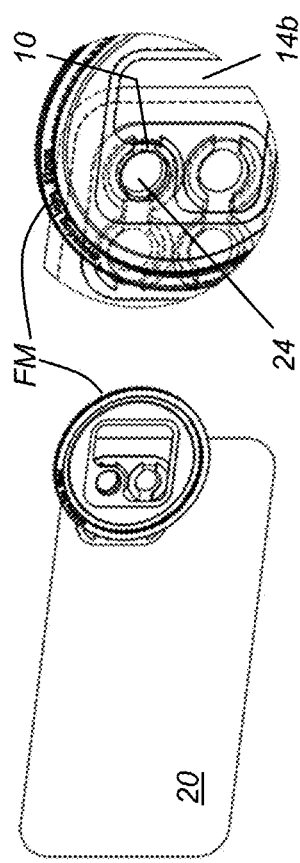 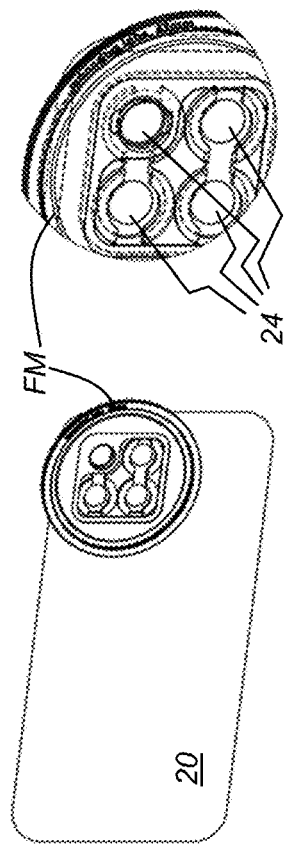

MULTI-CAMERA FILTER MOUNT

CROSS REFERENCE TO RELATED APPLICATIONS

This application claims the benefit of U.S. Provisional Application Ser. No. 63/039,697 entitled "MULTI-CAMERA FILTER MOUNT" in the names of Scott C. Cahall et al., filed 16 Jun. 2020 and incorporated herein in its entirety.

FIELD

The present disclosure relates to a filter mount for a smartphone or other device having multiple cameras along the same surface.

BACKGROUND

As smartphones and similar personal devices increase in capability, manufacturers have designed and marketed these devices with multiple cameras. As a result, users of these devices can enjoy the benefits of being able to capture images in a number of new ways.

However, with the added capabilities that multi-camera arrangements afford, there are some shortcomings that remain to be addressed. One of the problems with multi-camera configurations relates to the mounting of filters, polarizers or polarization filters, and other specialized planar optics that are routinely used to obtain special effects, to condition the light's spectral content or polarization, or to adapt the cameras to different lighting environments. While attempts have been made to adapt camera holders and rigs in order to mount filters and similar optics over multiple cameras simultaneously, existing solutions have proved to be difficult to use and can impose limitations on camera use that are unacceptable for many photographers.

Among difficulties with existing solutions is the need to provide simultaneous filter coverage to two or more lenses/cameras. In some cases, the smart phone user may be able to select which lens and camera are used for an imaging session; however, other features of the imaging system may automatically switch between cameras under control of preprogrammed instructions, so that the user may not have full control of which camera is being used at a particular time. In addition, some computational imaging functions specifically require the simultaneous access and use of multiple cameras in order to function properly.

Thus, there is a recognized need for filter mount solutions that are straightforward in design and use and surmount the problems in providing this added capability.

SUMMARY

The Applicants address the problem of mounting photographic filters and other planar optics over multiple camera lenses that are disposed along a surface of a smart phone. The removable filter mount works in conjunction with a standard smart phone encasement, such as a case, rig, or clip that is designed as a type of housing or mount for use with the smart phone, personal computer/communications device, or other electronic device having multiple cameras along the same surface.

According to an embodiment of the present disclosure, there is provided a filter mount for removably coupling an optical element to an encasement for a personal electronics device, wherein the encasement provides openings for light paths to at least first and second cameras within the encasement, the filter mount having a frame that defines:
 (i) a first orifice having a bayonet coupling, wherein the first orifice provides a first light path for imaging to at least the first camera;
 and
 (ii) a second orifice, adjacent to and coplanar with the first orifice and configured to provide a second light path for imaging to at least the second camera,
 and wherein rotation of the filter mount frame within the bayonet coupling couples the filter mount against the encasement and opens at least the first and second light paths to the corresponding cameras.

According to an embodiment of the present disclosure, an optical filter mount comprises a frame that is symmetrical about a central axis, wherein the frame has:
 (i) a circular orifice that defines a first light path and that has a bayonet fitting for coupling to a camera encasement;
 (ii) a second orifice, coplanar with the circular orifice, that defines a second light path;
 and
 (iii) a threaded inner surface that bounds the circular and second orifices and that is configured to seat an optical element over both the circular orifice and the second orifice.

DRAWINGS

FIG. 1C shows perspective views of a multi-camera filter mount according to an alternate embodiment.

FIG. 1D shows perspective front and rear views of a multi-camera filter mount according to another alternate embodiment.

FIGS. 2A, 2B, 2C, and 2D show perspective views of embodiments of filter mount FM for different camera arrangements on an encasement of a personal electronic device.

Figure 3B:
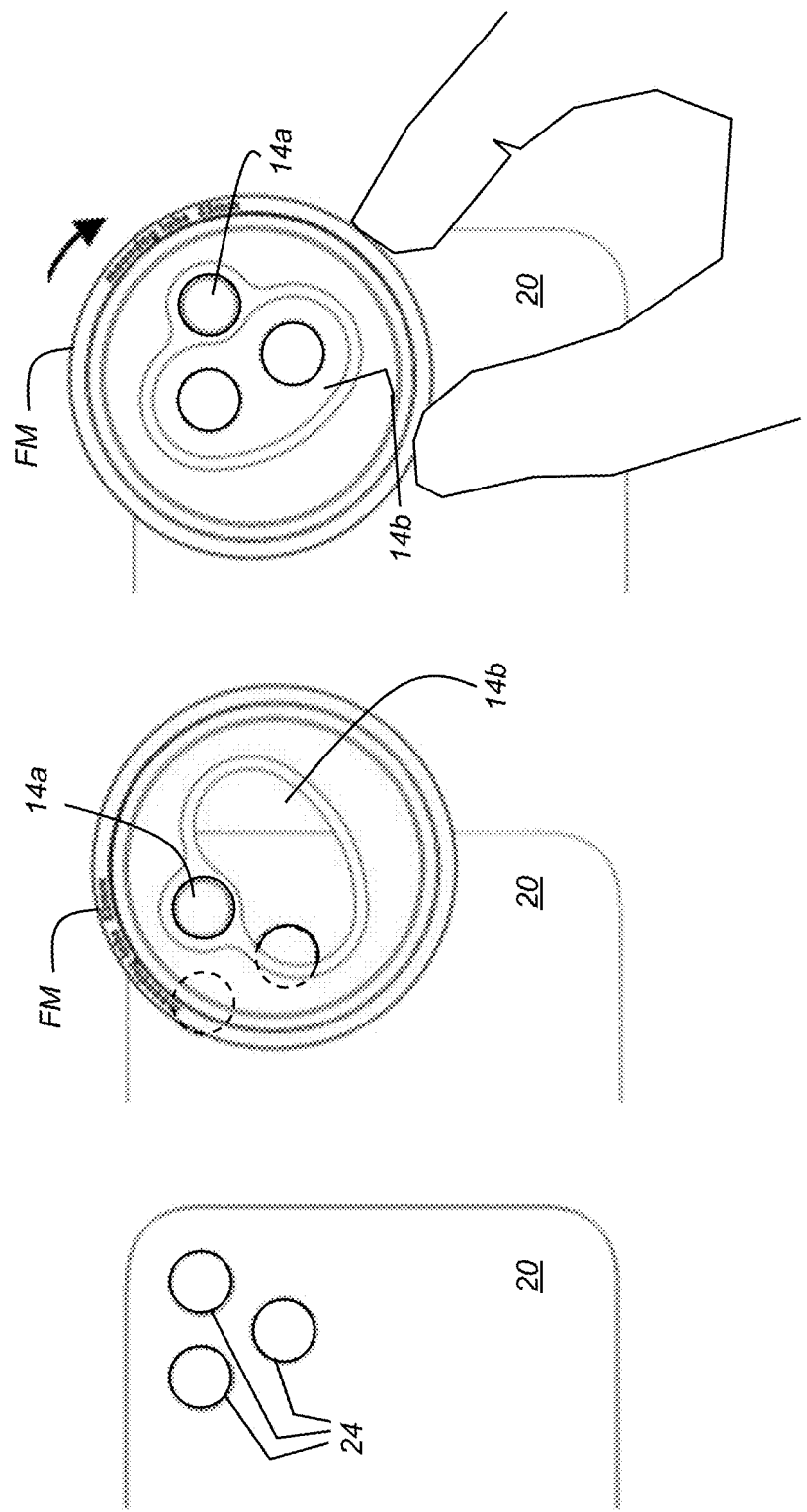

FIGS. 3A and 3B show successive steps for mount installation from a front view.

FIGS. 4A and 4B show a sequence for engagement of the filter mount for a 4-camera arrangement.

Figure 5:
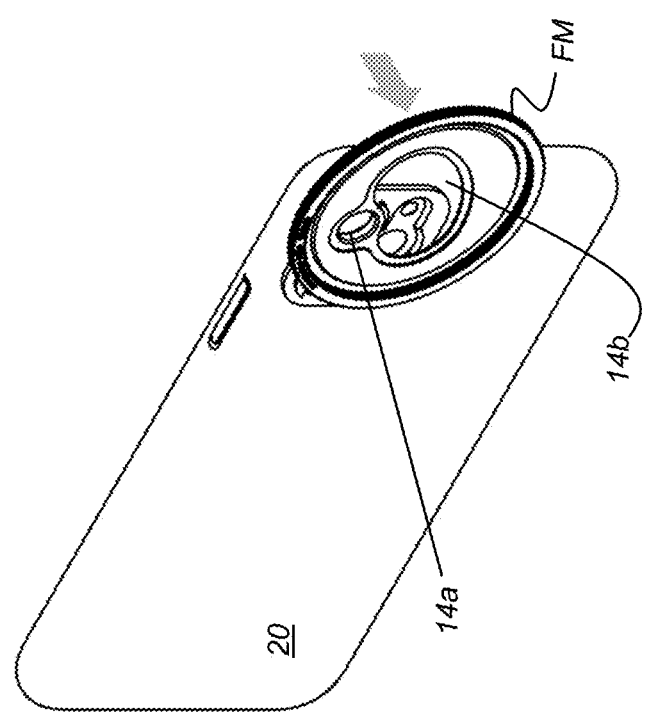

FIG. 5 is a perspective view showing a possible path for unwanted light when using a multi-camera filter mount.

FIGS. 6A-6E show the use of a baffle for blocking unwanted light from behind the device when using the multi-camera filter mount.

Figure 7C:
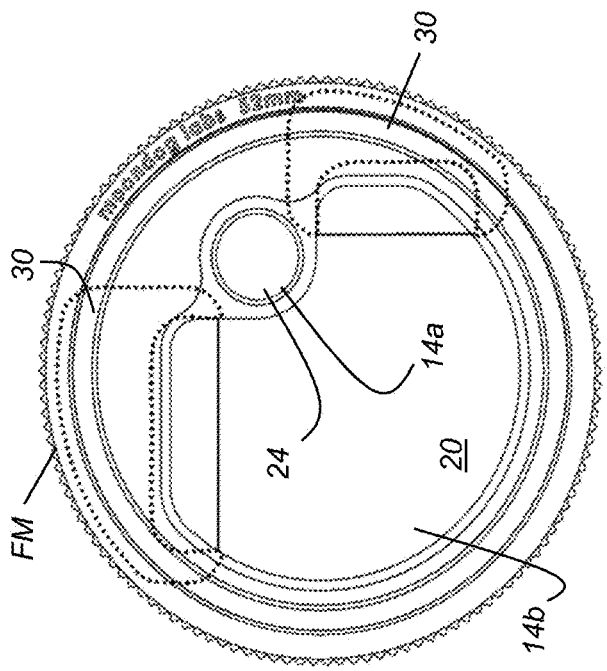
Figure 7A:
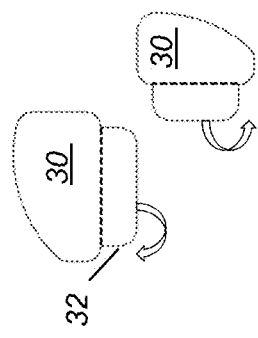
Figure 7B:
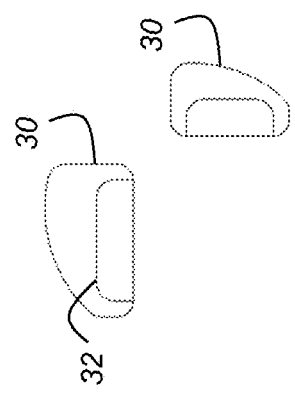

FIGS. 7A-7C show an alternate embodiment using two baffles.

DESCRIPTION

The following is a detailed description of some embodiments of the disclosure, reference being made to the drawings in which the same reference numerals identify the same elements of structure in each of the several figures.

Where they are used, the terms "first", "second", and so on, do not necessarily denote any ordinal, sequential, or priority relation, but are simply used to more clearly distinguish one element or set of elements from another, unless specified otherwise. In the context of the present disclosure, the terms "viewer", "operator", and "user" are considered to be equivalent and refer to the person who captures or views content and enters commands on a computer or handheld device.

In the context of the present disclosure, the general term "personal electronic device" or simply "personal device" is broadly used to encompass laptops or personal computers or camera systems or multi-camera devices as well as any of a number of types of wireless mobile or portable personal communications electronic devices that may be carried or used by a user. Hand-held electronic devices of this type can include personal communications electronic devices such as cellular phones, so-called "smartphones" that provide some type of mobile operating system, feature phones having at least some measure of computing capability, and various types of wireless, networked electronic pads, computerized tablets, consumer or professional cameras, and similar devices that can include multiple cameras disposed along one surface of the device. Examples of types of personal communications electronic devices that can be particularly useful for embodiments of the present disclosure include smartphones such as the Android™ smartphone platform (Android is a trademark of Google, Inc.), the iPhone (from Apple Inc.), tablet computers in general, the L16 camera (from Light Labs Inc.), smart watches, virtual/augmented/mixed reality systems with image capture capability, and devices with similar capability for acquiring digital images from multiple cameras mounted along substantially one surface of the device or substantially aimed in the same direction.

In the context of the present disclosure, the term "coupled" is intended to indicate a mechanical association, connection, fixed spatial relation, or positional linking between two or more components, such that the disposition of one component affects the spatial disposition of a component to which it is coupled. For mechanical coupling, two components need not be in direct contact, but can be linked through one or more intermediary components.

In the context of the present disclosure, the terms "optic" and "optics" are used generally to refer to filters, polarizers, lenses and other refractive, diffractive, and reflective components or apertures used for conditioning, shaping, or repositioning light.

In the context of the present disclosure, the terms "case" or "encasement" can generally be understood to include any of a number of products that are used to enclose, mount, or attach to a smart phone or other personal electronic device, such as a casing, frame, rig, cage, clip, or other device. The encasement provides openings for light paths to first and second objective lenses for cameras within the encasement, and can provide light openings that serve other additional lenses of the device.

For some devices, the encasement can also be the device housing itself. According to an embodiment of the present disclosure, at least a first camera has a first objective lens and a second camera has a second objective lens, wherein both lenses lie on or protrude from a surface that is substantially parallel to a surface of the encasement.

In the context of the present disclosure, the objective lens of a camera is the primary image-forming lens that creates an image of an object on an image-sensing surface. This objective lens can be of fixed focal length or variable focal length (i.e., zoom) and can be a fixed-focus or focusable type.

Personal electronic devices typically incorporate cameras. Many of these devices provide a single camera, located on any given side of a device. For devices having multiple cameras, with the cameras possibly having overlapping FOVs and having objective lenses on the same side of a personal electronic device, the use of filters, polarizers, and other removable optical attachments or other optics becomes increasingly more complicated. Where there are multiple cameras on a given side of a device and the objective lenses of the cameras are well-separated from each other, each camera could simply be provided with an individual mount for a filter or other substantially planar optical element. With more compact devices such as smartphones, however, lenses can be clustered along one edge or corner of the device or distributed over a large area of one side. Here, in any case, an arrangement with multiple filter mounts can be costly or impractical, with the likelihood that attachment would be difficult, with adjacent mounts that interfere with each other, optically or mechanically.

Described herein is a removable optical mount for holding a filter, including a spectral filter, a neutral density filter, an apodizing filter, an aperture array filter, a polarizer, special effect optic, aperture or aperture array, or other substantially planar optic that has a coupling to a case or rig or clip encasement for the smart phone or other device and that extends over multiple camera lenses on a single surface. The surface having the objective lens of each camera can be located substantially on one side of a personal communications device or pointing in substantially the same direction. Cameras can be offset from each other, considered in the direction orthogonal to the device surface, on some devices.

Figure 1A:
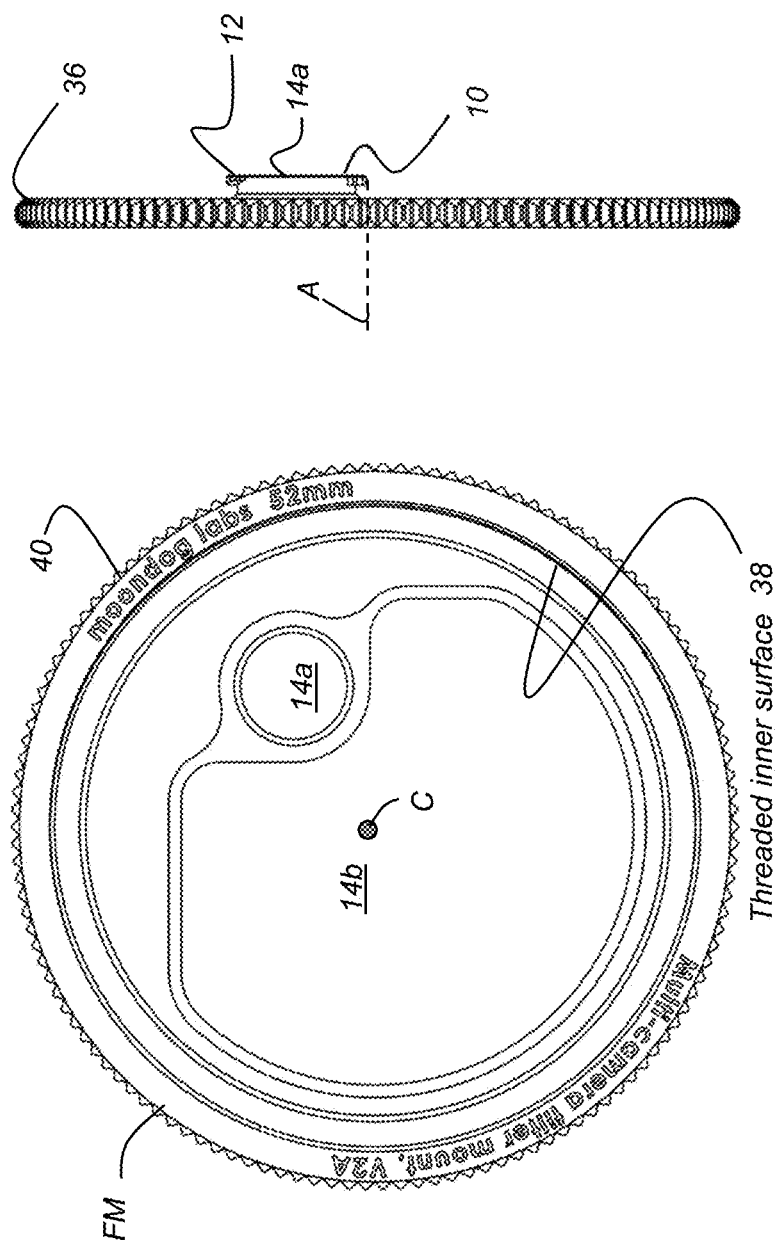
FIG. 1A shows plane and side views of a multi-camera filter mount according to an embodiment.

FIG. 1A shows plan and side views of a multi-camera filter mount FM having a frame 40 that is symmetrical about a central axis A. Frame 40 has two coplanar orifices or openings 14*a* and 14*b* according to an embodiment. Each orifice 14 defines a light path for a camera. One orifice 14*a* is circular and has a bayonet coupling 12, a well-known type of coupling used in the camera arts, as shown in FIG. 1A. The circular opening or orifice 14*a* is offset from the center C and from central axis A of the frame 40 in embodiments shown herein. The adjacent orifice 14*b* is typically non-circular, can be irregular in shape, and may encompass center C; the second orifice 14*b* is typically larger in area than the circular orifice 14*a* in embodiments shown herein. Frame 40 can have a knurled outer edge 36 and a threaded inner surface 38 (inner with respect to sides of the frame 40, with threads facing the center of mount FM) that surrounds or bounds first and second orifices 14 and is configured for seating an optical filter, such as a standard 52 mm threaded filter, for example within mount FM. Additional orifices 14 could be provided, depending on the configuration of the smart phone or other personal electronics device.

Figure 1B:
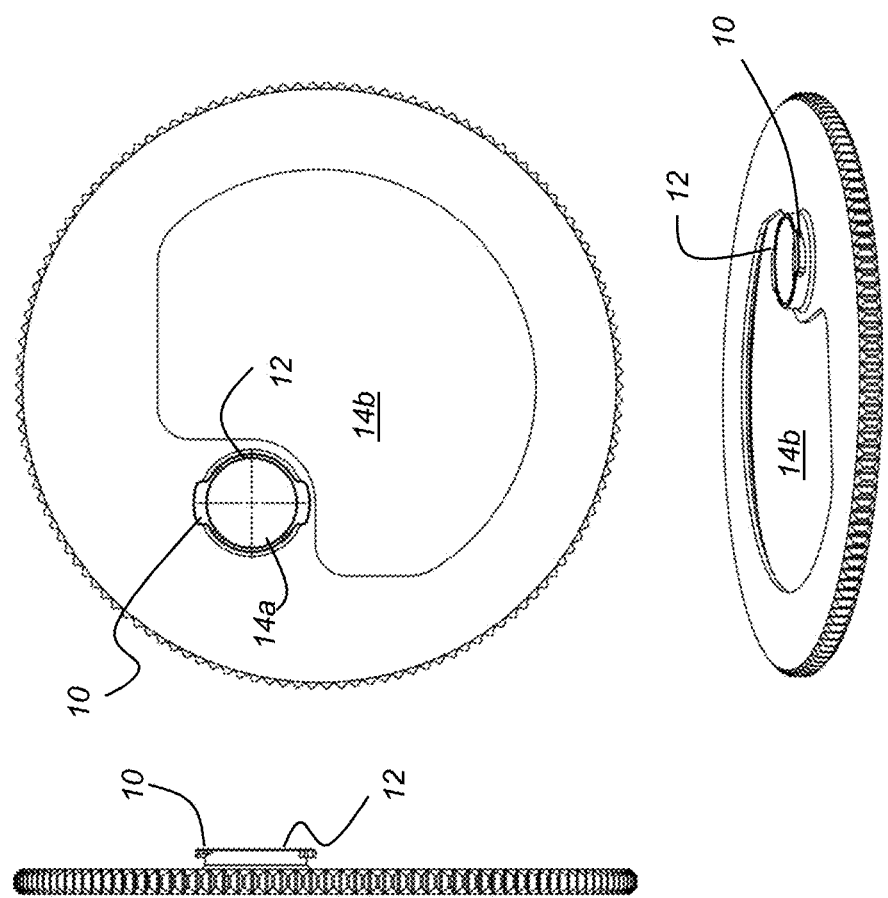
FIG. 1B shows the multi-camera filter mount from rear and perspective views.

FIG. 1B shows mount FM of FIG. 1A from rear and perspective views, with a cylindrical bayonet coupling 12 having tabs 10. FIG. 1C shows perspective views of multi-camera filter mount FM having openings or orifices 14*b* of an alternate shape. FIG. 1D shows perspective front and rear views of multi-camera filter mount FM according to another alternate embodiment wherein the mount has a slightly different arrangement of orifice 14*b* shapes than is shown in FIGS. 1A, 1B, and 1C.

Removable mount FM can be an attachment to an existing encasement, such as a case, rig, or clip for a smart phone, wherein the case, rig, or clip is provided with optical mounts that allow attachment of various optics in front of the prime lens of a camera. Among well-known providers of phone cases having such optical mounts is Moment (Seattle, Wash.), and RhinoShield (UK), for example. A typical compatible phone encasement has a bayonet mount receptor in the form of a circular opening that accepts a cylindrical connector having radial tabs or flattened pins that fit the receptor when oriented to a first angle, with respect to an axis, and can be rotated to a second angle to seat the connector within the circular opening and provide a locking mechanism that allows temporary coupling and removal of an optical or mechanical element.

Mount FM can have a male bayonet coupling 12 that is configured to couple with a corresponding female bayonet receptor fitting of compatible size and radius that is formed into the case or other encasement. The bayonet coupling 12 can be formed on the periphery of one circular lens orifice or opening 14a in mount FM. A second lens orifice 14b, coplanar with orifice 14a, can provide a window for mounting an optic in the path of one or more additional lenses of the encased camera.

One use of mount FM is to position a filter, polarizer, or other optic in the light paths of two or more cameras of the system. Thus, for example, the same spectral filter can simultaneously serve two or more cameras through the various openings or orifices 14 in mount FM.

According to an alternate embodiment of the present disclosure, orifices 14 of mount FM are configured differently. For example, each orifice 14 of mount FM can be configured for holding a different optic, so that each camera 24 of the smartphone or other personal electronic device has a different light-conditioning configuration.

According to the embodiment of FIG. 1C, second lens orifice 14b is kidney-shaped, as shown. FIG. 1D shows an alternative L-shaped orifice 14b. For some embodiments, as shown herein, the second lens orifice 14b can have a geometrically irregular shape, that is, not a circular shape, symmetrical shape, or regular polygon shape having all angles and side lengths equal, for example. Other alternative embodiments may use two circular orifices 14a, 14b or may effectively provide a single large orifice, providing an opening that is sizable enough to support simultaneous filter mounting for two or more cameras. Additional alternative embodiments can have multiple orifices or openings 14 of any suitable shape to provide a clear path for light from a visible object scene to pass through to multiple cameras simultaneously.

In embodiments shown herein, the geometrically irregular outline shape of orifice 14b allows the orifice 14b to provide a light path to one or more additional cameras that are provided on the encased smart phone.

According to an embodiment of the present disclosure, mount FM has a threaded inner surface 38 (FIG. 1A) that is configured for screw-in installation of a filter, polarizer, or other light conditioning optic using a bayonet-tab coupling. Standard sizes include 52 mm filters with threaded fittings, for example. Other filter-to-mount interfaces are possible, including magnetic, interference fit, clip-on, or flexible hook-and-loop or hook-and-pile connectors, such as VELCRO fasteners from Velcro Industries B.V., Amsterdam, NL, for example.

Frame 40 is shown as circular, but can be rectangular or some other shape, such as to support a rectangular filter. Mount FM can alternately be rectangular.

Figure 2A:
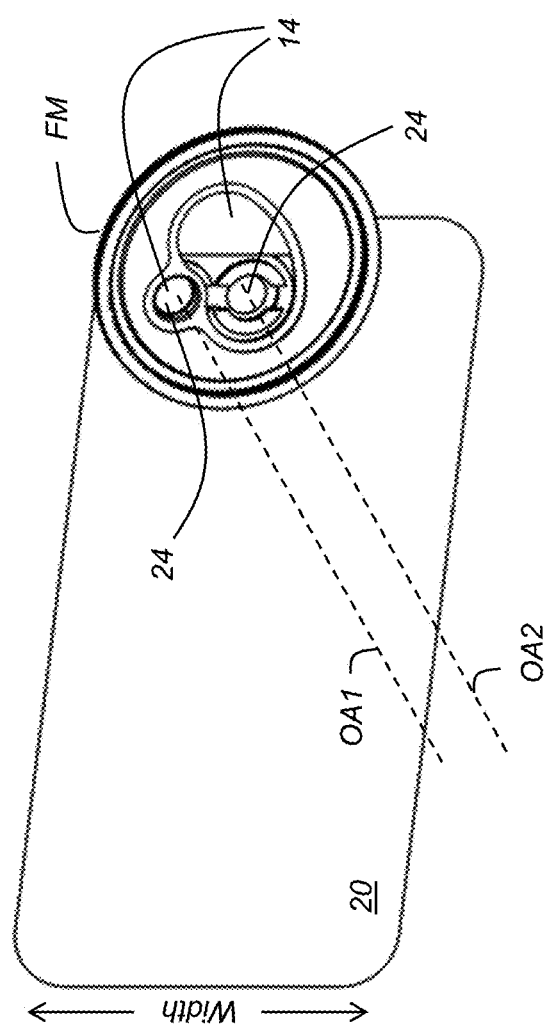
Figure 2B:
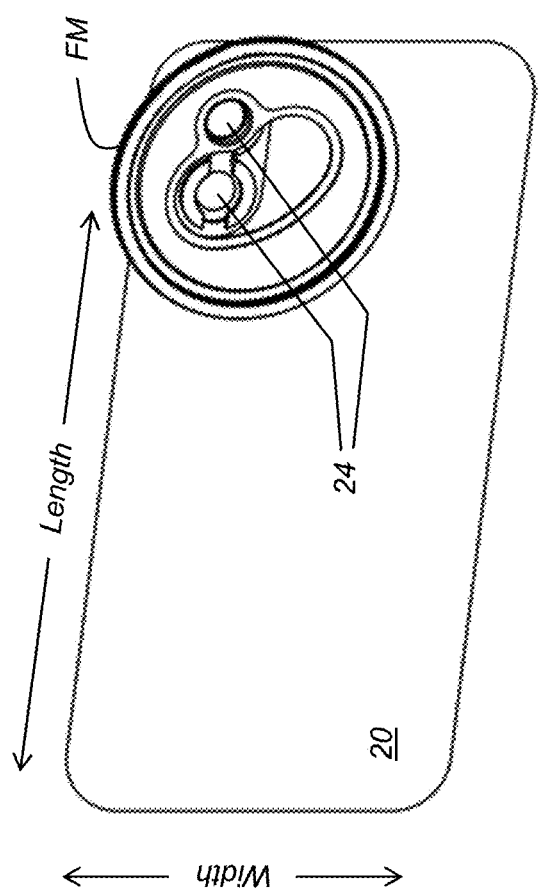
Figure 2C:
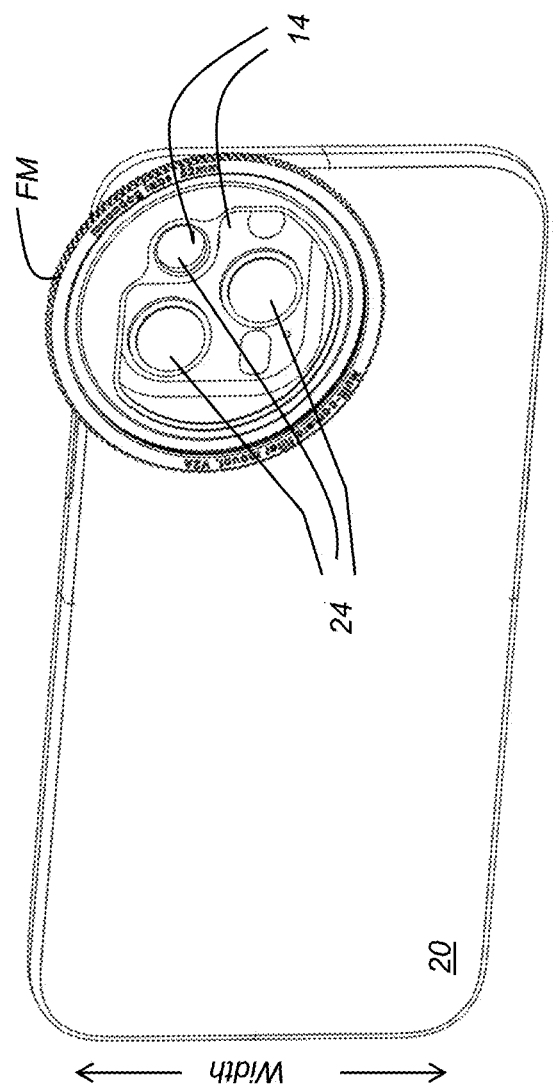
Figure 2D:
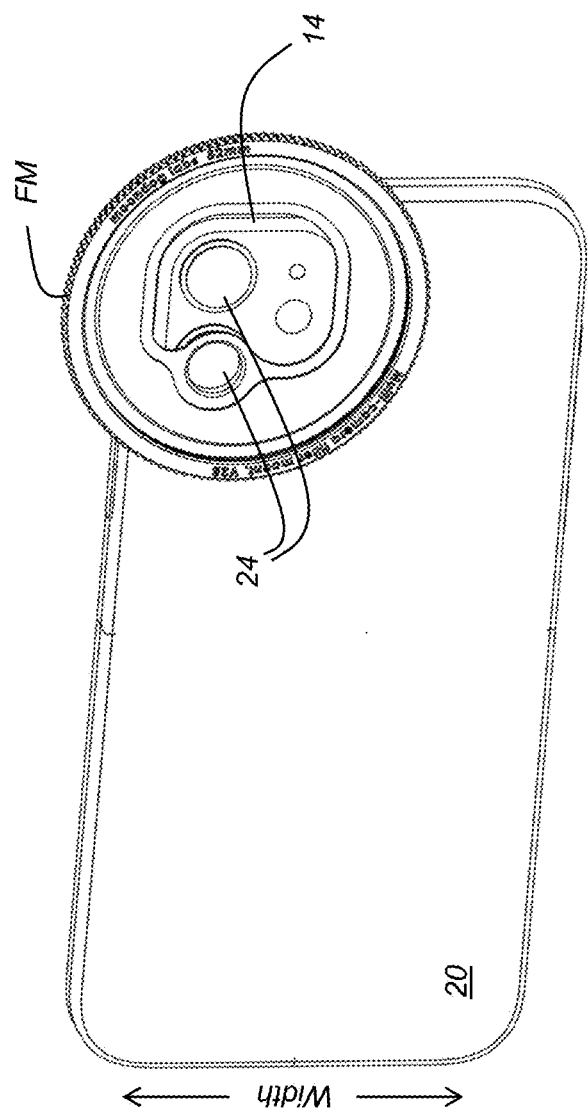

FIGS. 2A-2D show perspective views of an embodiment of filter mount FM for different camera arrangements on an encasement of a personal electronic device 20 such as a typical smartphone, for example. In the FIG. 2A embodiment, personal electronic device 20 has two cameras 24 arranged along the short or width dimension of the device 20 encasement. Filter mount FM provides a first light path to one camera 24, such as along an optical axis OA1; a second light path for a second camera 24 is provided by filter mount FM wherein the camera 24 has an optical axis OA2. In the FIG. 2B embodiment, personal electronic device 20 has two cameras 24 arranged orthogonally with respect to the FIG. 2A configuration, that is, along the length dimension of the device 20 encasement. In the FIG. 2C embodiment, personal electronic device 20 has an alternate arrangement with three cameras 24. FIG. 2D shows another arrangement for cameras arranged horizontally. It can be seen that filter mount FM is adaptable to these and other configurations wherein objectives of multiple cameras 24 lie along the same surface of personal electronic device 20.

FIGS. 3A and 3B present a series of schematic diagrams showing attachment of filter mount FM for a 3-camera arrangement. FIG. 3B shows individual attachment steps in more detail. At left is the encasement with openings for each camera 24, prior to attaching the filter mount FM. At center in FIG. 3B, the bayonet coupling of the filter mount is placed in position, with the first orifice 14a of filter mount FM provided for the first camera 24 lens. At right in FIG. 3B, partial rotation of filter mount FM within the bayonet coupling fits the second orifice 14b into position, disposing mount FM to provide an open light path for the second and third camera 24 lenses.

FIGS. 4A and 4B show a sequence for engagement of the filter mount for a 4-camera arrangement. In FIG. 4A, coupling 12 is positioned over the indicated camera 24 lens opening and bayonet 10 tabs are engaged. In FIG. 4B, filter mount FM has been rotated within the bayonet coupling to dispose orifices 14 in suitable position to allow light conveyance to each of the four cameras 24.

It can be appreciated that the multi-camera filter mount FM can be of particular utility for infrared (IR) imaging applications that use the smart phone camera. A stack of one or more appropriate filters can be installed within filter mount FM to block the majority of visible light and let pass the majority of IR light along the light path to device cameras, facilitating capture of images substantially in the IR spectrum. Filters can be used, for example, to block most of the visible light below 720 nm, 700 nm, 680 nm, or some other value, such as more than 50% of the visible light below a predetermined threshold wavelength. The filter then passes IR light and near-IR light, such as most of, or a high percentage of, the light above about 720 nm or 740 nm, such as more than 35%, for example.

One potential problem that can occur relates to unwanted transmission of stray light from the rear of filter mount FM. As is represented by the arrow symbol in FIG. 5, light from behind the device 20 camera can inadvertently find its way, via unwanted reflection, into one or more of the camera lenses if the stray light is not blocked in some way.

Figure 6B:
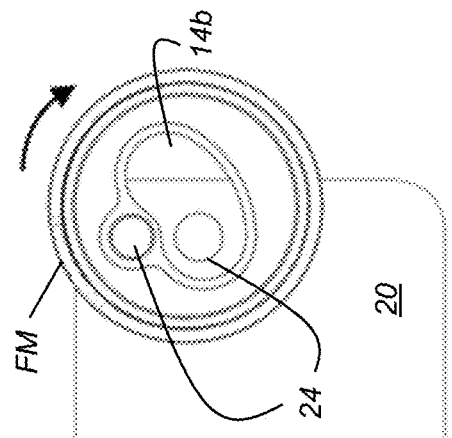
Figure 6A:
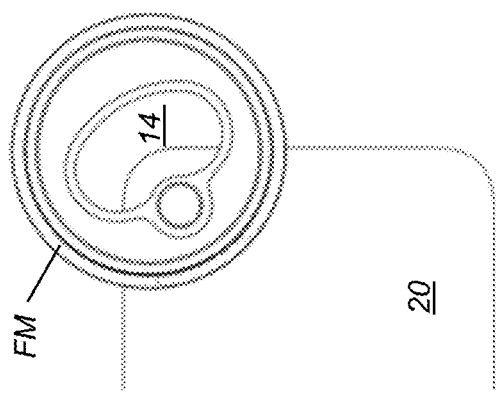
Figure 6E:
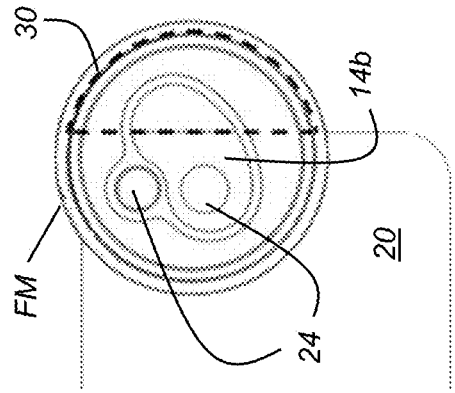
Figure 6C:
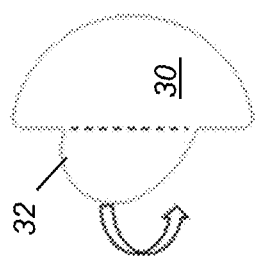
Figure 6D:
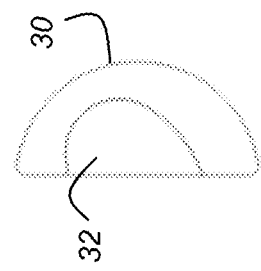

FIGS. 6A-6E show the use of a baffle 30 for blocking unwanted light from behind device 20 when mount FM is coupled to device 20. FIGS. 6A and 6B show the installation sequence for mount FM in an example wherein device 20 has two cameras 24. FIGS. 6C and 6D show a baffle 30 having an adhesive backing and a tab 32 for affixing to a portion of mount FM that protrudes beyond the edge of device 20. Baffle 30 can be formed from a material with a self-adhesive backing on one side, for example. Tab 32 can be folded over in order to protect orifice 14b from contact with adhesive. Other embodiments of baffle 30 may not require a folding operation by the user, as shown in FIGS. 6C and 6D. For example, baffle 30 can be pre-folded or fabricated in some other way, so that the user simply needs to attach it to the filter mount FM for use with any particular camera 24. FIG. 6E shows tab 30 affixed into place for blocking the path of stray light from behind mount FM, along one edge of device 20.

FIGS. 7A-7C show an alternate embodiment in which two baffles 30 are used, such as for a camera 24 that is positioned near a corner of the cell phone encasement.

Baffle 30 can be fabricated from any of a number of opaque materials, including thin plastic sheeting, foam, felt, so-called flocking paper, or any other suitable thin opaque material that can be attached to filter mount FM. Baffle 30 can be provided with mount FM, such as on a self-adhesive opaque sheet, so that it can be selectively positioned and adhered to the rear of filter mount FM without sticking to the filter or other planar optic that is installed within filter mount FM.

Other attachment configurations for mounting filters or other optics can employ magnetic coupling, interference fit, clip-on fasteners, or may use flexible hook-and-loop or hook-and-pile connectors, such as VELCRO fasteners from Velcro Industries B.V., Amsterdam, NL, for example.

Disclosed includes a filter mount for removably coupling to a case or other encasement for a personal electronic device having at least a first and a second camera disposed along the same surface, the filter mount having at least a first orifice outfitted with a bayonet coupling, wherein the first orifice provides an open orifice to at least the first camera, and wherein rotation of the filter mount to secure the filter mount against the case opens a second orifice to at least the second camera disposed along the same surface.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by any appended claims, and all changes that come within the meaning and range of equivalents thereof are intended to be embraced therein.

The invention claimed is:

1. An optical filter mount comprising a frame, wherein the frame has:
   (i) a circular orifice that defines a first light path and that has a bayonet fitting for coupling to a camera encasement,
   wherein the circular orifice is offset from a central axis of the frame;
   (ii) a second orifice, coplanar with the circular orifice, that defines a second light path;
   and
   (iii) a threaded inner surface that bounds the circular and second orifices and that is configured to seat an optical element over both the circular orifice and the second orifice.

2. The filter mount of claim 1 wherein an optical element installed within the filter mount conditions incident light in both the first light path and the second light path.

3. The filter mount of claim 1 further comprising an additional attachable element disposed to block light from behind the filter mount.

4. The filter mount of claim 1 wherein the first light path has a first light filter and the second light path has a different light filter.

5. The filter mount of claim 1 wherein at least one spectral filter is installed within the frame.

6. The filter mount of claim 1 wherein at least one polarizer is installed within the frame.

7. A filter mount for removably coupling an optical element to an encasement for a personal electronics device,
   wherein the encasement provides openings for light paths to at least first and second cameras within the encasement,
   the filter mount having a frame that is configured to seat at least one optical element, wherein the frame defines:
   (i) a first orifice having a bayonet coupling, wherein the first orifice provides a first light path for imaging to at least the first camera, wherein the first orifice is offset from a central axis of the frame;
   and
   (ii) a second orifice, adjacent to and coplanar with the first orifice and configured to provide a second light path for imaging to at least the second camera,
   and wherein rotation of the filter mount frame within the bayonet coupling couples the filter mount against the encasement and opens at least the first and second light paths to the corresponding cameras.

8. The filter mount of claim 7 wherein the frame has a knurled outer edge.

9. The filter mount of claim 7 further comprising one or more detachable baffles for obstructing stray light to either the first or the second camera.

10. The filter mount of claim 7 wherein the frame further has a threaded inner surface, bounding both the first and second orifices, and configured for seating one or more planar optical elements along the first and second light paths.

11. The filter mount of claim 7 wherein the frame is configured to seat a neutral density filter.

12. The filter mount of claim 7 wherein the frame is configured to seat a polarizing filter.

13. The filter mount of claim 7 wherein the frame is configured to seat a spectral filter that blocks most of the visible light below 720 nm and passes most of the infrared light above 720 nm.

14. The filter mount of claim 7 wherein the frame is configured to seat an apodizing filter.

15. The filter mount of claim 7 wherein the frame is configured to seat an aperture array filter.

16. The filter mount of claim 7 wherein the frame is rectangular.

17. A method for mounting an optical filter comprising:
   providing a frame having a first circular orifice with a bayonet coupling and a second orifice that is coplanar with the first circular orifice, wherein the first circular orifice is offset from a central axis of the frame;
   attaching the optical filter to the frame, wherein the optical filter extends over the first and second orifices;
   and
   coupling the frame to an encasement for a device that has at least first and second cameras mounted along the same surface.

18. The method of claim 17 further comprising attaching a baffle along an edge of the frame for blocking stray light.

* * * * *